(12) United States Patent
Simon et al.

(10) Patent No.: US 10,162,043 B2
(45) Date of Patent: Dec. 25, 2018

(54) OPTICAL LOCATING SYSTEM

(71) Applicants: Pierre-Michel G. Simon, Gradignan (FR); Michael Sansur, Modjeska, CA (US)

(72) Inventors: Pierre-Michel G. Simon, Gradignan (FR); Michael Sansur, Modjeska, CA (US)

(73) Assignee: Sensormatic Electronics, LLC, Boca Raton, FL (US)

(*) Notice: Subject to any disclaimer, the term of this patent is extended or adjusted under 35 U.S.C. 154(b) by 526 days.

(21) Appl. No.: 15/019,084

(22) Filed: Feb. 9, 2016

(65) Prior Publication Data
US 2017/0016976 A1 Jan. 19, 2017

Related U.S. Application Data

(60) Provisional application No. 62/193,243, filed on Jul. 16, 2015.

(51) Int. Cl.
*G01C 3/08* (2006.01)
*G01S 5/02* (2010.01)
(Continued)

(52) U.S. Cl.
CPC .......... *G01S 5/0252* (2013.01); *G01S 1/042* (2013.01); *G01S 5/0226* (2013.01); *H04B 7/0617* (2013.01)

(58) Field of Classification Search
CPC ...... G01S 5/0252; G01S 1/042; G01S 5/0226; H04B 7/0617
See application file for complete search history.

(56) References Cited

U.S. PATENT DOCUMENTS 4,786,167 A  11/1988  Rothbone et al.
6,865,347 B2  3/2005  Perkins et al.
(Continued)

FOREIGN PATENT DOCUMENTS

| WO | 98/45728 A1 | 10/1998 |
|---|---|---|
| WO | 2013/089525 A1 | 6/2013 |
| WO | 2014/009250 A1 | 1/2014 |
| WO | 2014/093400 A1 | 6/2014 |
| WO | 2015/034503 A1 | 3/2015 |

OTHER PUBLICATIONS

PCT International Search Report and Written Opinion of the International Searching Authority (EPO) for International Application No. PCT/US2016/040430 (dated Sep. 26, 2016).
Liu, Hugh Sing, "Positioning Beacon System Using Digital Camera and LEDs," IEEE Transactions on Vehicular Technology, vol. 52, No. 2, Mar. 2003, 0018-9545/03, copyright 2003 IEEE.
(Continued)

*Primary Examiner* — Samantha K Abraham
(74) *Attorney, Agent, or Firm* — Fox Rothschild LLP; Robert J. Sacco; Carol E. Thorstad-Forsyth

(57) ABSTRACT

Systems and methods for uniquely identifying areas within a facility for location services. The methods involve: operating a plurality of beacons disposed within the facility; emitting, from a first beacon of the plurality of beacons, a first beam having a first beamwidth in a manner so as to communicate at least a unique identification code associated with a first physical area of the facility; changing a value for a beamwidth parameter to modify an area of coverage for the first beacon; and emitting, from the first beacon, a second beam having a second beamwidth in a manner so as to communicate at least the unique identification code associated with the first area of the facility, where the second beamwidth is different from the first beamwidth. The changing is performed autonomously by the first beacon or in
(Continued)

response to the first beacon's reception of a command from a remote beacon receiver.

20 Claims, 8 Drawing Sheets

(51) Int. Cl.
  *H04B 7/06* (2006.01)
  *G01S 1/04* (2006.01)

(56) References Cited

U.S. PATENT DOCUMENTS

| | | | |
|---|---|---|---|
| 7,123,159 B2 | 10/2006 | Giannopoulos et al. | |
| 7,969,297 B2 | 6/2011 | Haartsen et al. | |
| 2005/0272472 A1 | 12/2005 | Goldberg | |
| 2009/0243856 A1* | 10/2009 | Lee | G06Q 10/087 340/572.1 |
| 2010/0208236 A1 | 8/2010 | Damink et al. | |
| 2012/0070152 A1 | 3/2012 | Preston et al. | |
| 2013/0141554 A1 | 6/2013 | Ganick et al. | |

OTHER PUBLICATIONS

Magatani, K., et al., "Development of the Navigation System for the Visually Impaired by Using Optical Beacons," Engineering in Medicine and Biology Society, 2001. Proceedings of the 23rd Annual International Conference of the IEEE (vol. 2 ), ISSN: 1094-687X.

Miodrag, B., et al., "Hardware Realization of Autonomous Robot Localization System," MIPRO 2012.MEET, (http://mipro-proceedings.com/sites/mipro-proceedings.com/files/upload/meet/meet_030.pdf).

Pang, G.K.H., et al., "LED Location Beacon System Based on Processing of Digital Images," IEEE Transactions of Intelligent Transportation Systems, vol. 2, No. 3, pp. 135-150, Sep. 2001, 1524-9050/01, copyright 2001 IEEE.

* cited by examiner

OPTICAL LOCATING SYSTEM

CROSS-REFERENCE TO RELATED APPLICATIONS

This application claims priority to U.S. Patent Application No. 62/193,243, filed Jul. 16, 2015. The content of the above application is incorporated by reference in its entirety.

FIELD OF THE INVENTION

This document relates generally to wireless based systems. More particularly, this document relates to optical systems and methods for locating people and/or items within a facility.

BACKGROUND OF THE INVENTION

The ability to accurately determine the location of a person or item within a building is a desirable objective. RFID technology has conventionally been used in the identification and tracking of products, equipment, and even people. For example, RFID systems are commonly used in Electronic Article Surveillance ("EAS") and in logistical and inventory systems for monitoring goods and equipment and recording information on the target item. An RFID system typically includes an RFID reader and an RFID device such as a tag or label. The RFID reader may transmit a Radio-Frequency ("RF") carrier signal to the RFID device. The RFID device may respond to the RF carrier signal (or interrogator signal) with a data response signal (or authentication reply signal) encoded with information stored on the RFID device. RFID devices may store information such as a unique identifier or an Electronic Product Code ("EPC") associated with an article or item.

The RFID technology allows retailers to rapidly and/or continuously identify products, count products and track product locations. As such, the RFID technology offers significant benefits over a physical inventory counting process. By leveraging the RFID technology to increase inventory accuracy, retailers are better able to perform replenishment, service customer requests, manage product recalls or any other activities that rely on inventory data. With this level of inventory visibility, retailers must also take on the additional burden of being able to locate specific products easily and quickly so that they can service the above-listed use cases. Products on the market today to aid in determining a product's location are either too expensive or not accurate enough to serve this need.

Indoor proximity systems are well known in the art. One conventional indoor proximity system is known as iBeacon®. iBeacon® employs Bluetooth communication technology to connect to mobile communication devices (e.g., cellular phones). Upon establishment of such connection, the iBeacon® requests and receives first information from each Mobile Communication Device ("MCD"). The first information includes information which has been agreed upon by the cell user for provision to the iBeacon®. The iBeacon® can also push second information to the MCD. The Bluetooth communication technology is based on a 2.45 GHz transmission, and its data rate ranges from 1 Mbit to 24 Mbit.

SUMMARY OF THE INVENTION

The present disclosure concerns systems and methods for uniquely identifying areas within a facility for location services. The methods involve: operating a plurality of beacons disposed within the facility; emitting, from at least a first beacon of the plurality of beacons, a first beam having a first beamwidth in a manner so as to communicate at least a unique identification code associated with a first physical area of the facility; changing a value for a beamwidth parameter to modify an area of coverage for the first beacon; and emitting, from the first beacon, a second beam having a second beamwidth in a manner so as to communicate at least the unique identification code associated with the first area of the facility. The changing is performed autonomously by the first beacon or in response to the first beacon's reception of a command from a remote beacon receiver. The second beamwidth is different from the first beamwidth.

In some scenarios, the value for the beamwidth parameter is changed so that at least two of the beacons have an overlapping area of coverage. Additionally or alternatively, the information specifying the first beamwidth is communicated from the first beacon via the first beam and information specifying the second beamwidth is communicated from the first beacon via the second beam. Also, interference may be minimized between the first beacon and an adjacent second beacon of the plurality of beacons by communicating error correction codes from the first beacon via the first and second beams. Randomized transit timing may be used to minimize interference between the first beacon and an adjacent second beacon of the plurality of beacons.

In those or other scenarios, each of the plurality of beacons has a known directional emission pattern. Additionally or alternatively, the remote beacon receiver is worn by a person or carried by the person as an accessory of a mobile tag reader.

In those or yet other scenarios, the methods further involve: determining an inaccurate location of a mobile tag in the facility using a mobile tag reader to read a fixed tag with a known location; and increasing an accuracy of the inaccurate location using the first beacon's known physical location which is associated with the unique identification code emitted from the first beacon via the first or second beam. The mobile tag is considered as being located in a Zone Of Interest ("ZOI") of the first beacon for which the unique identifier has been received by the mobile tag reader and if existing in a vicinity of the fixed tag in close time proximity. A map may be generated and/or displayed that shows at least one of a location of the mobile tag reader relative to the first beacon in multi-dimensional space and a location of the fixed tag relative to the first beacon in multi-dimensional space.

DESCRIPTION OF THE DRAWINGS

Embodiments will be described with reference to the following drawing figures, in which like numerals represent like items throughout the figures, and in which.

DETAILED DESCRIPTION

Figure 1:
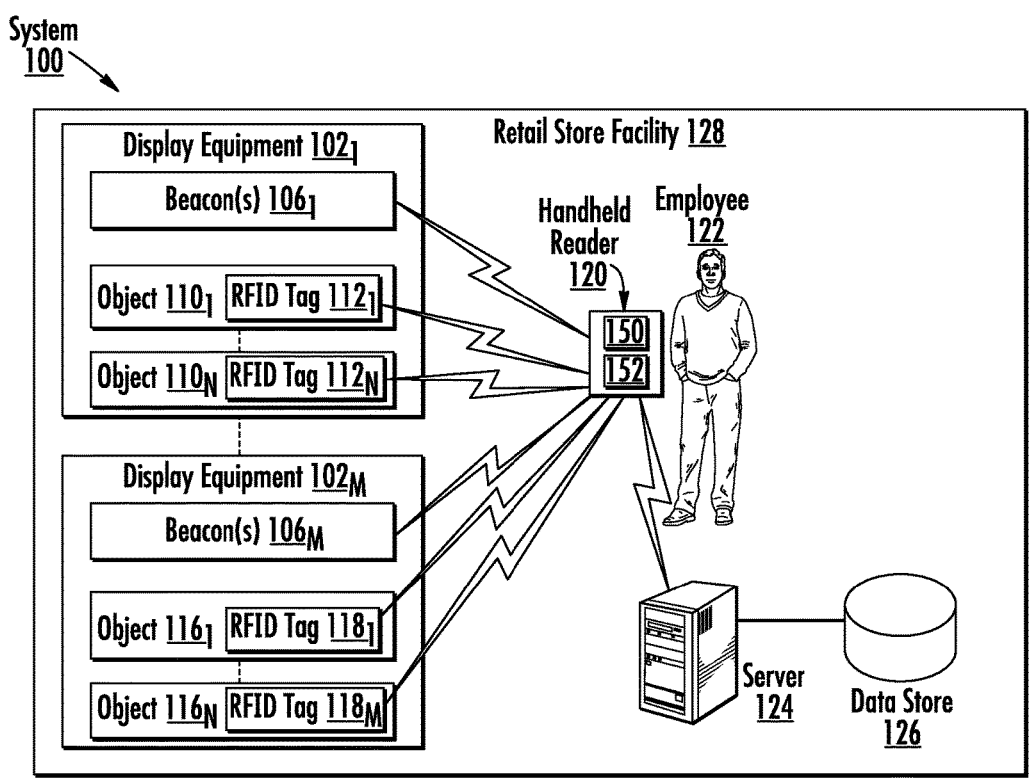
FIG. 1 is a schematic illustration of an exemplary system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present disclosure concerns low cost systems and methods for uniquely identifying areas within a facility for location services including inventory systems. Each system comprises a plurality of beacons and a beacon receiver. The beacons operate in terms of having a variable beamwidth control to change the area of coverage and to allow for varying installations (e.g., different ceiling heights). The beacon beamwidths can be tuned such that they have the same area of coverage regardless of the respective distances between the beacons and objects of interest (e.g., a floor or shelf). Information is communicated from the beacons to the beacon receiver specifying which beamwidth is being used thereby at a particular time. Error correction codes can also be embedded in the signals sent from the beacons so that any interference between adjacent beacons can be detected. Additionally or alternatively, the beacons employ randomized transit timing for minimizing interference between adjacent beacons.

During operation, the beacons each broadcast a unique identification code that illuminates an area to form an association between a physical location and the unique identification code. The beacons may be positioned on ceilings, walls and furniture to form Zones OF Interest ("ZOI"). The beacons are designed to be inexpensive, small, lightweight, autonomous, simple to install, long lasting, and energy efficient. In some scenarios, the beacons implement energy harvesting circuits. The beacon receiver (when positioned within a zone) determines its physical location by decoding the unique identification code. The beacon receiver's physical location may then be used to determine the location of tags through association.

Notably, the present solution preserves inventory time and accuracy with no additional staff training and minimal infrastructure. For example, stationary tags (that are read by a mobile RFID reader) are considered as being located within the facility. However, this knowledge does not provide an accurate enough location of the fixed tags for certain applications. As such, additional operations are performed to increase the accuracy of the fixed tag's locations. Therefore, once these relatively inaccurate locations of the fixed tags are obtained, additional information can be used to obtain a more accurate determination of the fixed tags' locations within the facility. Also, operations are performed to determine an accurate location of the beacon receiver which is attached to a mobile RFID reader being used to read the fixed tags. Thereafter, a three dimensional map is generated and presented to the user showing the location of the handheld reader and/or the locations of the fixed tags relative to the beacon receiver in three dimensional space.

This location information is useful for many purposes. For example, the location information can be used to micro-locate items during an inventory process. Knowing accurate locations of items within a facility would be a tremendous feature for warehouse, retailer, hospitals and other applications where tracking items is needed.

The basic idea of this disclosure can be easily understood in a small retail store context. Let's assume that eight fixed beacons are placed around the walls of the retail store at known locations. Alternatively or additionally, fixed tags (e.g., locator tags) are placed around the retail store. In the beacon scenarios, each beacon transmits a unique identification code and has a known directional emission pattern. A beacon receiver reads the unique identification codes of the fixed beacons while also reading tags coupled to items. The beacon receiver can be worn by a person or carried by the person as an accessory of a handheld tag reader. The tags that are read by the handheld reader are considered as being located in the ZOI of one of the fixed beacons for which a unique identifier has been received by the handheld reader (or an accessory of the handheld reader) and if existing in the vicinity of the fixed tag read in close time proximity.

The orientation of the beacon receiver can also be determined based on sensor data generated by sensors (e.g., gyroscopes, accelerometers and/or magnetometers) internal to the beacon receiver. The orientation can then be used to align the beacon receiver's optical detector with the beacon's optical emitter.

Notably, the more RFID tags read by the handheld reader, the more information is obtained to determine how far the handheld reader is from a fixed beacon and/or tag. The handheld reader can vary its RFID read power and use an averaging technique to improve its location determinations. Once the RFID tag's locations have been determined, the three dimensional map can be updated to show the same.

Exemplary Systems

Referring now to FIG. 1, there is provided a schematic illustration of an exemplary system 100 that is useful for understanding the present invention. The present invention is described herein in relation to a retail store environment. The present invention is not limited in this regard, and can be used in other environments. For example, the present invention can be used in distribution centers, factories and other commercial environments. Notably, the present invention can be employed in any environment in which objects and/or items need to be located and/or tracked.

The system 100 is generally configured to allow improved person and/or item locating within a facility using beacon technology. As shown in FIG. 1, system 100 comprises a Retail Store Facility ("RSF") 128 in which display equipment $102_1, \ldots, 102_M$ is disposed. The display equipment is provided for displaying objects (or items) $110_1$-$110_N$, $116_1$-$116_N$ to customers of the retail store. The display equipment can include, but is not limited to, shelves, article display cabinets, promotional displays, fixtures and/or equipment securing areas of the RSF 128. The RSF can also include emergency equipment (not shown), checkout counters and an EAS system (not shown). Emergency equipment, checkout counters, and EAS systems are well known in the art, and therefore will not be described herein.

Beacons $106_1, \ldots, 106_M$ are located at strategic locations within the RSF 128. In some scenarios, the beacons are disposed on display equipment $102_1, \ldots, 102_M$, as shown in FIG. 1. Additionally or alternatively, the beacons are disposed on emergency equipment, checkout counters, walls, ceilings, furniture and/or EAS system equipment (e.g., pedestals near an entrance/exit of the RSF). Beacons are well known in the art, and therefore will be described briefly below in relation to FIG. 2. The beacons are generally configured to facilitate a periodic or continuous determination of physical locations of a beacon receiver 150 and/or the objects within the RSF 128. In some scenarios, the beacons are incorporated into a flexible tape or other flexible structure (e.g., circuit board) with pre-defined spacing therebetween (e.g., 1–N feet). The flexible structure enables relatively easy installation of the beacons.

The beacons $106_1, \ldots, 106_M$ rely on highly directional signals (such as optical signals) in order to illuminate a well-defined zone (e.g., a shelf). Accordingly, the beacons can include, but are not limited to, optical beacons. A block diagram of an exemplary architecture for an optical beacon 200 is provided in FIG. 2.

Figure 2:
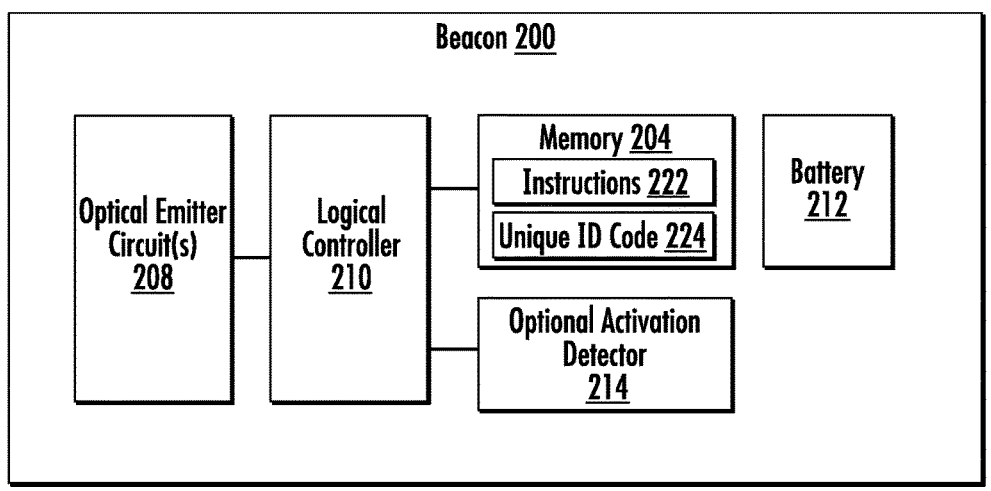
FIG. 2 is a block diagram of an exemplary architecture for an optical beacon.

As shown in FIG. 2, the optical beacon 200 comprises at least one optical emitter circuit 208, a logic controller 210, a memory 204, a battery 212 and an optional activation detector 214. The logic controller 210 modulates an optical emitter to send a unique identification code. In addition to the unique identification code, emitted or transmitted beacon data may include, but is not limited to, beam power, beamwidth, system status (e.g., battery level, temperature, etc.), and/or an error detection code. Multiple optical emitter circuits may be employed by the optical beacon 200 to create multiple beams for better area coverage. These beams may share a common unique identification code or some combination of unique identification codes. The optional activation detector 214 is used to locally activate the beacon 200 from a command sent by the beacon receiver 150. This serves to reduce beacon power consumption and limit potential signal jamming between adjacent beacons.

The beacons $106_1, \ldots, 106_M$ are positioned so that beams are emitted toward locations where items are stored (e.g., shelves). For example, the beacons may be mounted overhead emitting downward to limit operator body shielding and avoid blocking obstacles. In some scenarios, the beacons would not emit vertically but with certain angles. The coverage of a beacon is the field in which the beacon receiver is able to receive and decode the beacon signals. This field is called the "Zone-Of-Interest" or "ZOI". The locations of the ZOIs are known. Each ZOI is identified by the unique identification code communicated from a respective beacon. The beacons can be arranged so that their ZOIs do or do not overlap. Overlapping ZOIs provide a means to compensate shadowing from an operator body or obstacles.

Each ZOI contains the items to be inventoried and located. The size of the ZOI depends on the location accuracy. In some exemplary cases, the ZOI is less than a one (1) meter radius. The RSF 128 has a plurality of ZOIs. A single ZOI could encompass a single shelf, rack or table. The present invention is not limited to the particulars of this example.

By correlating RFID tag reads and the location ID received from the beacon, it is possible to determine the location of objects $110_1, \ldots, 110_N$, $116_1, \ldots, 116_N$ within the RSF 128. In this regard, it should be understood that information is stored in a data store 126 that specifies the known locations of the beacons in three dimensional space. This information can be stored in the data store 126 using a server 124. Server 124 will be described in more detail below in relation to FIG. 5.

The beacons $106_1, \ldots, 106_M$ are designed to be inexpensive, light, small, autonomous, easy to mount, long lasting and energy efficient. In this regard, the beacons may comprise an energy harvesting circuit. The energy harvesting circuit can include, but is not limited to, a solar cell array, a rechargeable battery, a super capacitor and/or a voltage converter.

A beacon receiver 150 is provided for communicating with the beacons $106_1, 106_M$. In this regard, the beacon receiver 150 is designed to receive beacon signals from the beacons when placed within the ZOIs, respectively. The beacon receiver 150 may be provided as an accessory to a handheld reader 120, or alternatively worn by an operator of the handheld reader 120 to optimize reception and to avoid the obstruction of beacon signals by the operator's body. The shoulders, head or arms of the operator are relatively good placements to receive highly directional signals from the beacons $106_1, \ldots, 106_M$.

The beacon receiver 150 may use broad and/or multiple sensors pointing at different directions to maximize reception and compensate the operator's movement and motion. The beacon receiver 150 could use the fusion of inertial sensors (e.g., a gyroscope, an accelerometer and/or a magnetometer) to identify the spatial position of the beacon receiver, and therefore the direction of the inertial sensor. In some scenarios, only location IDs received from the sensor pointing up is used. In this case, the inertial sensors are used to determine which sensor is pointing up and therefore which sensor to listen.

As noted above, the handheld reader 120 is generally configured to read RFID tags $112_1, \ldots, 112_N, 118_1, \ldots, 118_N$. The RFID tags $112_1$-$112_N$, $118_1$-$118_N$ are respectively coupled to the objects $110_1$-$110_N$, $116_1$-$116_N$. The RFID and locator tags are described herein as comprising single-technology tags that are only RFID enabled. The present invention is not limited in this regard. The RFID and locator tags can alternatively or additionally comprise dual-technology tags that have both EAS and RFID capabilities.

In some scenarios, the handheld reader 120 operates in a static configuration. The operator sets the power and other RFID parameters before reading tags to inventorying the same. The whole inventory of tags is performed with the configuration set at the start of the inventorying process.

In other scenarios, the handheld reader 120 operates in a dynamic configuration. The handheld reader 120 dynamically adapts its parameters based on whether or not it is present within a ZOI. When the handheld reader 120 is not present within a ZOI, the handheld reader 120 operates in a default mode, i.e., using a maximum power and reading RFID tags only once to ensure inventory accuracy in a timely manner. When the handheld reader 120 is within a ZOI, the handheld reader 120 operates in a location mode, i.e., it toggles between reads at high power and reads at low power. The power used to read an RFID tag is inversely proportional to a tag location confidence factor. That is, the lower the power used to read an RFID tag, the higher the tag location confidence. High power reads ensure inventory accuracy, while low power reads allow location accuracy. In location mode, an RFID tag can be read multiple times to allow the correlation logic to re-allocate an RFID tag from one location to another. The power can be dynamically adjusted depending on the RFID tag density being read. As inventory accuracy has to be maintained, the power applied in location mode can be reduced in case of dense tag population, and vice versa.

During operation of system 100, RFID tag location is performed by allocating a ZOI to each RFID tag. The ZOI is identified by the unique identification code received from a beacon when the RFID tags' are being read by the handheld reader 120. As the beacon position is known and associated with a unique identification code, the physical location of the beacon receiver 150 and/or RFID tag is deduced and located as being within the ZOI of the beacon.

Notably, the unique identification code is not constantly received while the beacon receiver is in the ZOI. Accordingly, the mode of the handheld reader is maintained for a certain period of time ("latch time") and renewed each time a unique identification code is received. The latch time does not exceed a few seconds as the operator can physically move from one ZOI to another ZOI within a few seconds. For each unique identification code received, a time window is defined in which occurred tag reads are associated with the location.

In some scenarios, two or more ZOIs overlap or RFID tags may be read from an adjacent ZOI, which causes cross-reads to occur. A cross-read is a tag read from a first ZOI to a second ZOI. Cross-reads cause location conflicts and may reduce location accuracy. In order to resolve location conflicts, a location confidence is computed for each unique identification code and for each tag involved. The location confidence is computed based on the number of reads, an average Received Signal Strength Indicator ("RSSI"), a max RSSI and the handheld reader's power level at the time of a tag read. The tag location is deduced from the unique identification code having the highest location confidence value. An RFID tag can be declared between multiple locations if there is no clear winner based on the location confidences.

In other scenarios, simple logic is employed to determine tag locations. For example, the handheld reader records a time window centered on a timestamp of each received unique identification code. Then for each RFID tag, the timestamp of the read having the highest RSSI is used to retrieve the associated unique identification code if it is included in a recorded time window. The location is deduced from the unique identification code.

The ZOI coverage has to be known to enable beacon receiver location and/or tag location. This mapping can be done by taking physical measurements. Additionally or alternatively, a fingerprint technique is employed. Using the handheld reader 120 with a touch screen, a user records received unique identification codes while pinpointing (his) her position on a map displayed on the touch screen. By doing so, the ZOIs are mapped to physical locations and maintained in a database.

The field emitted by a beacon $106_1, \ldots, 106_M$ could be shaped in order to guarantee that its emitting signals cover the corresponding ZOI. Beacons may contain a control system allowing the beacon receiver to remotely change the beacon beamwidth and range (e.g., by controlling power delivered to an optical emitter circuit 208 of FIG. 2). The beacon receiver would provide a feedback to the operator (visual, audible or vibration) indicating the receiving of unique identification code. Using the feedback and the beamwidth/power remote control, the operator can adjust the beacon to confine the field to the corresponding ZOI. This operation may be performed once during installation or at least once during operation of the beacon receiver to determine its physical location within a facility. As the beams are highly directional, the beacon receiver 150 would only receive signals from the beacon pointing to its location whatever its position in space. Accordingly, the beacon receiver can more accurately determine its physical location between adjacent beacons by commanding nearby beacons to vary their beamwidths and correlating received optical data with the receiver position.

Alternatively, beacons may autonomously vary beamwidth and encode beamwidth data into the transmitted data packet to simplify the design of the system 100. The beamwidths employed can be pre-defined and pre-stored in a data store of the beacons (e.g., at installation time so as to compensate for differences in ceiling heights). An order in which the beamwidths should be used can be pre-defined as well (e.g., at installation time). A change in beamwidth can occur at a pre-defined or pre-specified time (e.g., change the beamwidth after transmission of 2 signals or upon expiration of defined time period).

A more complex implementation could use multiple beacons emitting in multiple directions from various placements (e.g., ceilings, walls, furniture, etc.). The beacon receiver receives multiple unique location codes from multiple beacons at a time. Knowing the coverage of each beacon, a geometric computation is performed to deduce the beacon receiver's position in space. The position can also be retrieved from a database previously populated by a site survey (beacons fingerprint). The combination of unique location codes is the key to access the location entry of the database. Knowing the beacon receiver's position in space, the location mode of the handheld reader 120 could be applied if detected nearby item storage. The item locations are deduced from the handheld reader's position at the time reads occurred. Additionally, a beacon receiver equipped with directional sensors pointing in various directions can deduce its approximate position in space (roll, pitch and yaw) and location as it would receive specific unique location codes from specific sensors at specific positions. A sampling of those position and location combinations can be stored in a database using the fingerprint method and retrieved later.

A further useful beacon feature is randomized transmission timing to limit jamming between nearby beacons. Knowing the size of data packets and the associated transmission time, the start of transmission may be scheduled with a randomized timing factor to limit jamming between nearby beacons. Should jamming occur, the error detection code within data packets permit faulty data to be ignored by the receiver unit. This requires no synchronization between beacons, thus simplifying the system design and reducing cost.

The placement pattern of beacons can be tailored to a variety of applications. For example, beacons may be deployed to form scattered zones of interest for product displays and inventory shelves. When placed in a regular grid pattern on a ceiling, beacons may be used to determine the location of a beacon receiver within a room with a high degree of accuracy.

Figure 3:
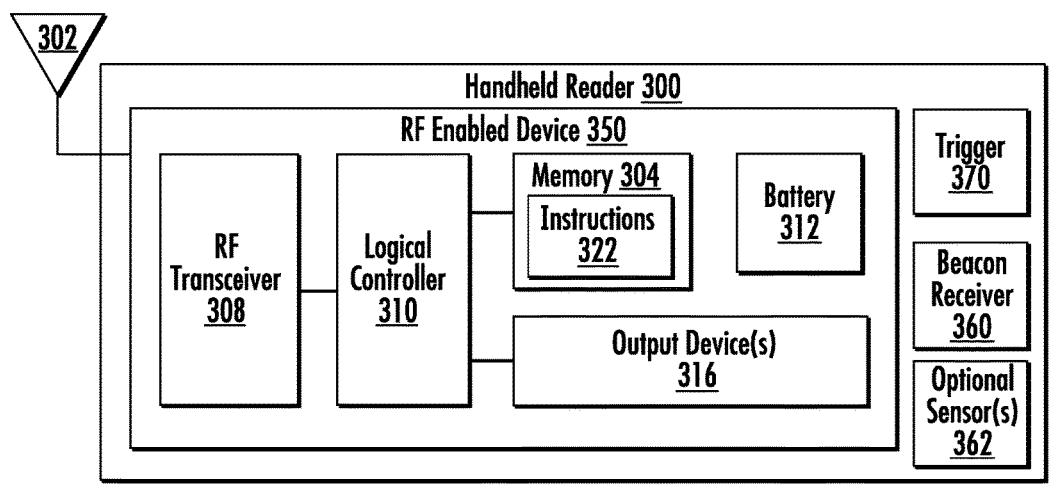
FIG. 3 is a block diagram of an exemplary architecture for a handheld reader.

Referring now to FIG. 3, there is provided a detailed block diagram of an exemplary architecture for a handheld reader 300. Handheld reader 120 of FIG. 1 is the same as or similar to handheld reader 300. As such, the discussion of handheld reader 300 is sufficient for understanding handheld reader 120.

Handheld reader 300 may include more or less components that shown in FIG. 3. However, the components shown are sufficient to disclose an illustrative embodiment implementing the present invention. Some or all of the components of the handheld reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an embodiment of a representative handheld reader 300 configured to facilitate improved object locating within an RSF (e.g., RSF 128 of FIG. 1). In this regard, the handheld reader 300 comprises an RF enabled device 350 for allowing data to be exchanged with an external device (e.g., RFID tags $112_1, \ldots, 112_N, 118_1, \ldots, 118_N$ of FIG. 1) via RF technology. The components 304-316 shown in FIG. 3 may be collectively referred to herein as the RF enabled device 350, and include a power source 312 (e.g., a battery).

The RF enabled device 350 comprises an antenna 302 for allowing data to be exchanged with the external device via RF technology (e.g., RFID technology or other RF based technology). The external device may comprise RFID tags $112_1, \ldots, 112_N, 118_1, \ldots, 118_N$ of FIG. 1. In this case, the antenna 302 is configured to transmit RF carrier signals (e.g., interrogation signals) to the listed external devices, and/or transmit data response signals (e.g., authentication reply signals) generated by the RF enabled device 350. In this regard, the RF enabled device 350 comprises an RF transceiver 308. RFID transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the location of the handheld reader 300 within a facility (e.g., RSF 128 of FIG. 1). Accordingly, the logic controller 310 can store the extracted information in memory 304, and execute algorithms using the extracted information. For example, the logic controller 310 can perform correlate tag reads with beacon reads to determine the location of the RFID tags within the facility.

Notably, memory 304 may be a volatile memory and/or a non-volatile memory. For example, the memory 304 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 304 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to where RFID tags are located within a facility. Other functions of the RF enabled device 350 will become apparent as the discussion progresses.

The handheld reader 300 may also comprise a beacon receiver 360. The beacon receiver 360 is generally configured to: receive a command signal from the RF enabled device 350 to obtain unique identification codes from beacons; send signals to the beacons (e.g., beacons $106_1, \ldots, 106_M$ of FIG. 1) requesting that unique identification codes be communicated therefrom; and receiving signals communicated from the beacons; parsing unique identification codes from the received signals; and communicating the unique identification codes to the RF enabled device 350. The command signal can be generated by and sent from the RF enabled device 350 in response to an operator's depression of a trigger 370.

Figure 4:
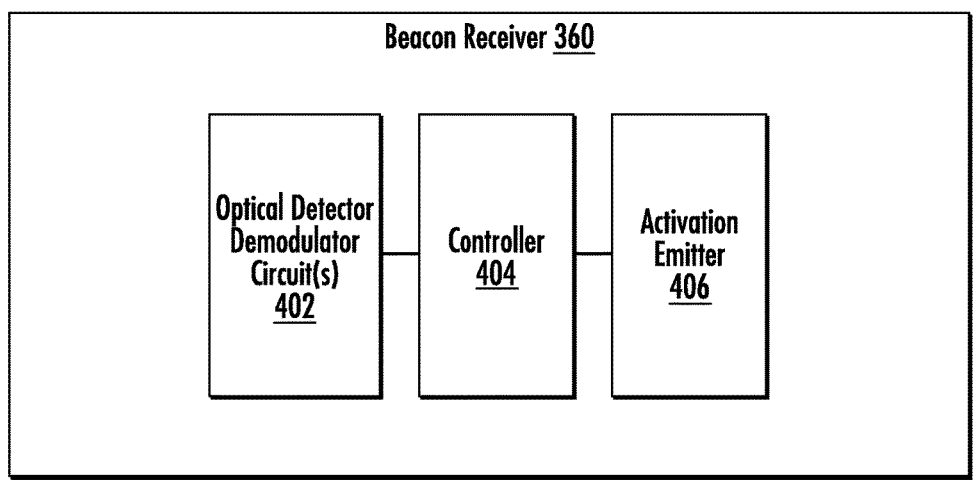
FIG. 4 is a block diagram of an exemplary architecture for a beacon receiver.

A more detailed block diagram of the beacon receiver 360 is provided in FIG. 4. As shown in FIG. 4, the beacon receiver 360 comprises at least one optical detector demodulator circuit 402, a controller 404 and an activation emitter 406. The controller 404 decodes beacon data. The activation emitter 406 command nearby beacons to transmit beacon data. A lens or multiple optical detector demodulator circuits 402 may be employed to create a wider field of view for receiving optical beacon data. This can be useful for compensating for hand tilt and roll when the beacon receiver is combined with a handheld reader. The beacon receiver can be positioned in various ways to improve reception of beacon data. For example, the beacon receiver could be mounted on the handheld reader. Alternatively, the beacon receiver could be mounted on a hat worn by the operator conducting an inventory scan or mounted on a robotic platform.

Referring again to FIG. 3, the handheld reader 300 may further comprise an optional sensor 362 (e.g., an acoustic sensor or infrared sensor). The sensor 362 detects the distance from the handheld reader 300 to the RFID tags being read (e.g., RFID tags $112_1, \ldots, 112_N, 118_1, \ldots, 118_N$ of FIG. 1). A distance threshold value can be applied to trigger the location mode. The distance can be used to adjust the read power of the handheld reader. The distance can be used to compute more precise tag locations.

Figure 5:
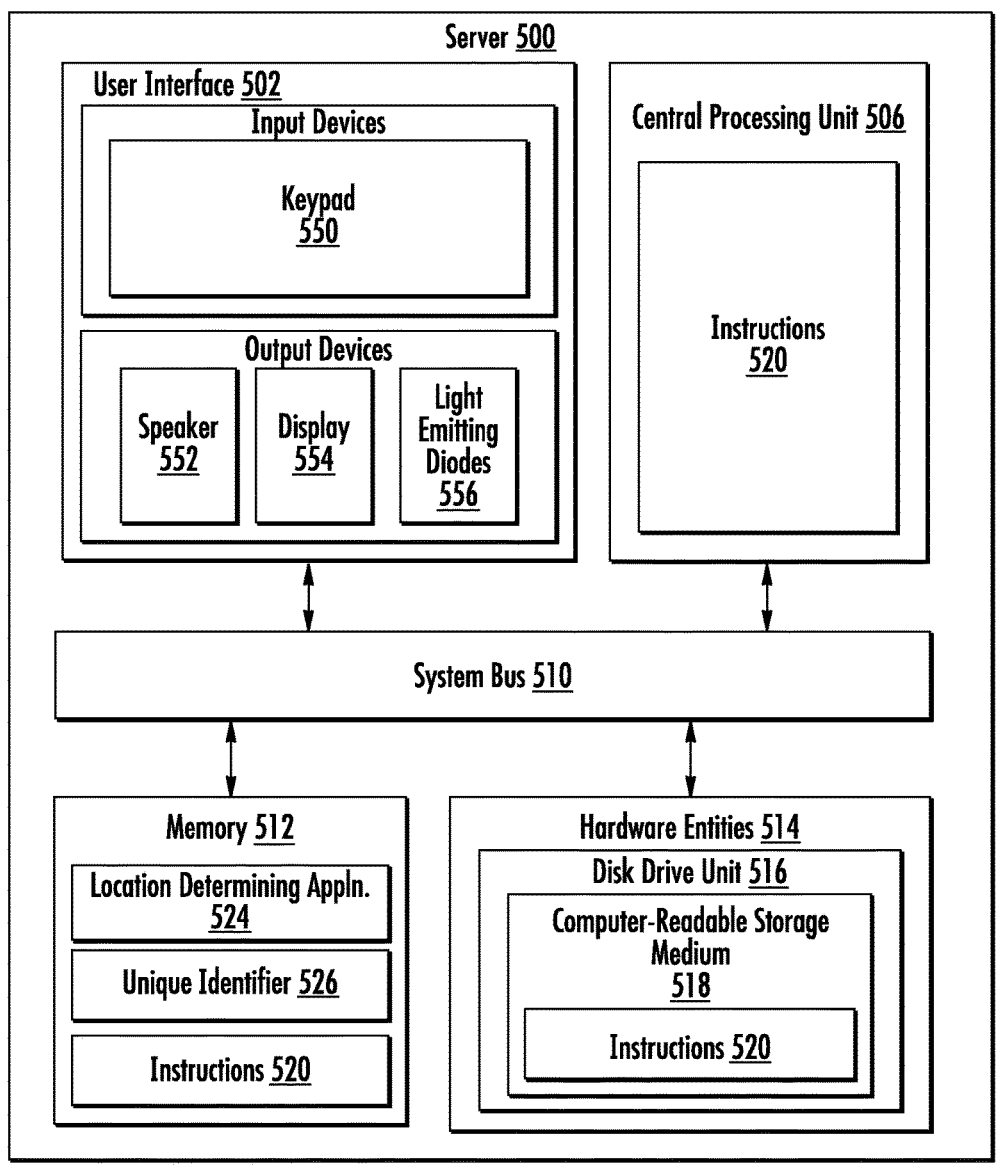
FIG. 5 is a block diagram of an exemplary architecture for a server.

Referring now to FIG. 5, there is provided a detailed block diagram of an exemplary architecture for a server 500. Server 124 of FIG. 1 is the same as or substantially similar to server 500. As such, the following discussion of server 500 is sufficient for understanding server 124.

Notably, the server 500 may include more or less components than those shown in FIG. 5. However, the components shown are sufficient to disclose an illustrative embodiment implementing the present invention. The hardware architecture of FIG. 5 represents one embodiment of a representative server configured to facilitate the provision of a three dimensional map showing locations of RFID tags (e.g., RFID tags $112_1, \ldots, 112_N, 118_1, \ldots, 118_N$ of FIG. 1) within an RSF (e.g., RSF 128 of FIG. 1). As such, the server 500 of FIG. 5 implements at least a portion of a method for providing such beacon reader and tag locations in accordance with embodiments of the present invention. Some or all the components of the server 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the server 500 comprises a user interface 502, a Central Processing Unit ("CPU") 506, a system bus 510, a memory 512 connected to and accessible by other portions of server 500 through system bus 510, and hardware entities 514 connected to system bus 510. The user interface can include input devices (e.g., a keypad 550) and output devices (e.g., speaker 552, a display 554, and/or light emitting diodes 556), which facilitate user-software interactions for controlling operations of the server 500.

At least some of the hardware entities 514 perform actions involving access to and use of memory 512, which can be a Random Access Memory ("RAM"), a disk driver and/or a Compact Disc Read Only Memory ("CD-ROM"). Hardware entities 514 can include a disk drive unit 516 comprising a computer-readable storage medium 518 on which is stored one or more sets of instructions 520 (e.g., software code) configured to implement one or more of the methodologies, procedures, or functions described herein. The instructions 520 can also reside, completely or at least partially, within the memory 512 and/or within the CPU 506 during execution thereof by the server 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 520 for execution by the server 500 and that cause the server 500 to perform any one or more of the methodologies of the present disclosure.

In some embodiments of the present invention, the hardware entities 514 include an electronic circuit (e.g., a processor) programmed for facilitating the provision of a three dimensional map showing locations of RFID tags within a facility. In this regard, it should be understood that the electronic circuit can access and run a location determining application 524 installed on the server 500. The software application 524 is generally operative to facilitate: the determination of beacon reader and/or RFID tag locations within a facility; and the mapping of the beacon reader location and/or RFID tag locations in a virtual three dimensional space. Other functions of the software application 524 will become apparent as the discussion progresses.

Figure 6:
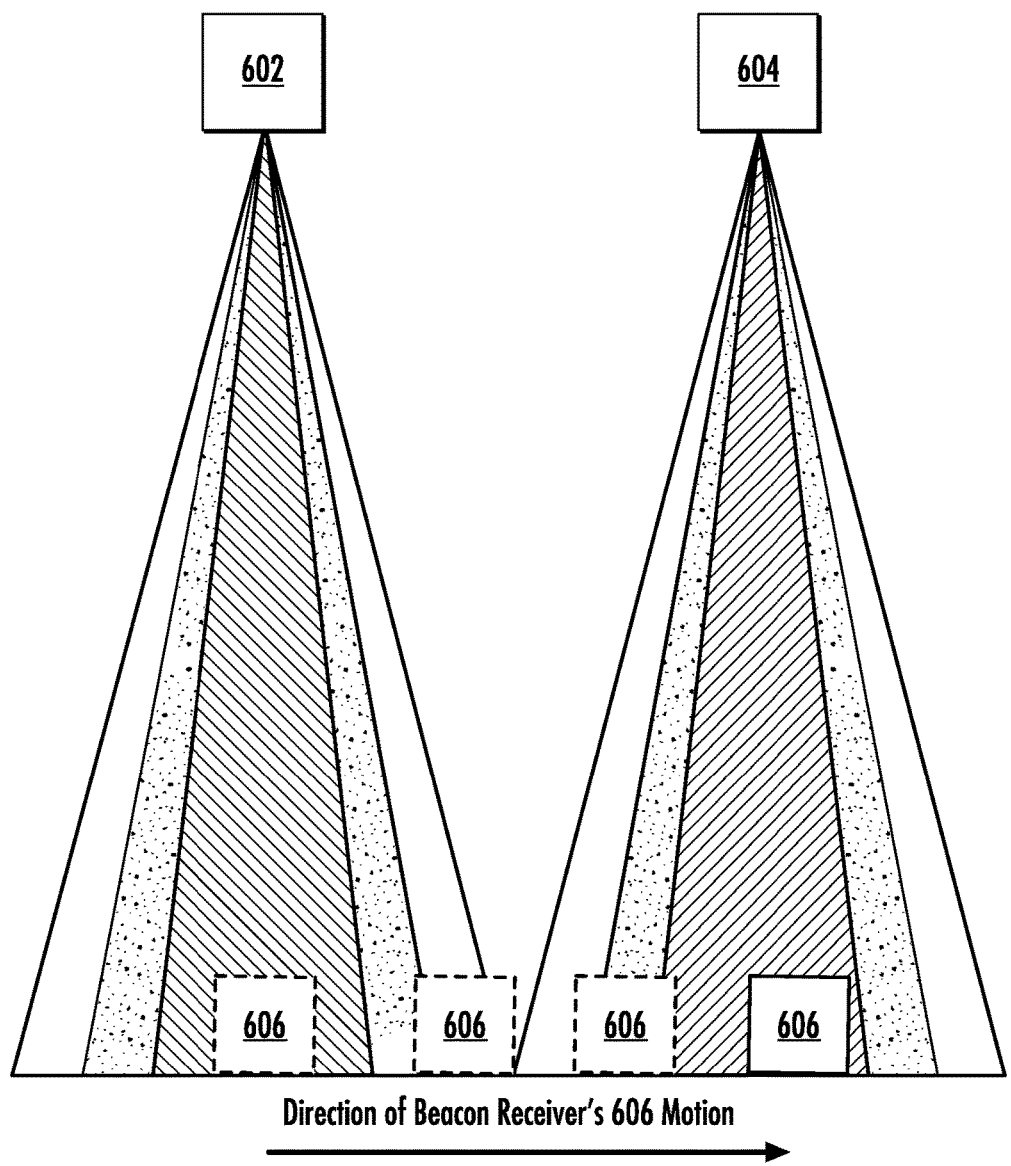
FIG. 6 is an illustration showing a cross-sectional view of two adjacent beacons each with three different beamwidths and a receiver in motion encountering different beacon zones.

Referring now to FIG. 6, there is provided an illustration showing a cross-sectional view of two adjacent beacons 602, 604 and a receiver 606. Each beacon has three different beamwidths. The receiver 606 is in motion so as to encounter different beacon zones.

Exemplary Methods for Locating a Device in a Facility

Figure 7A:
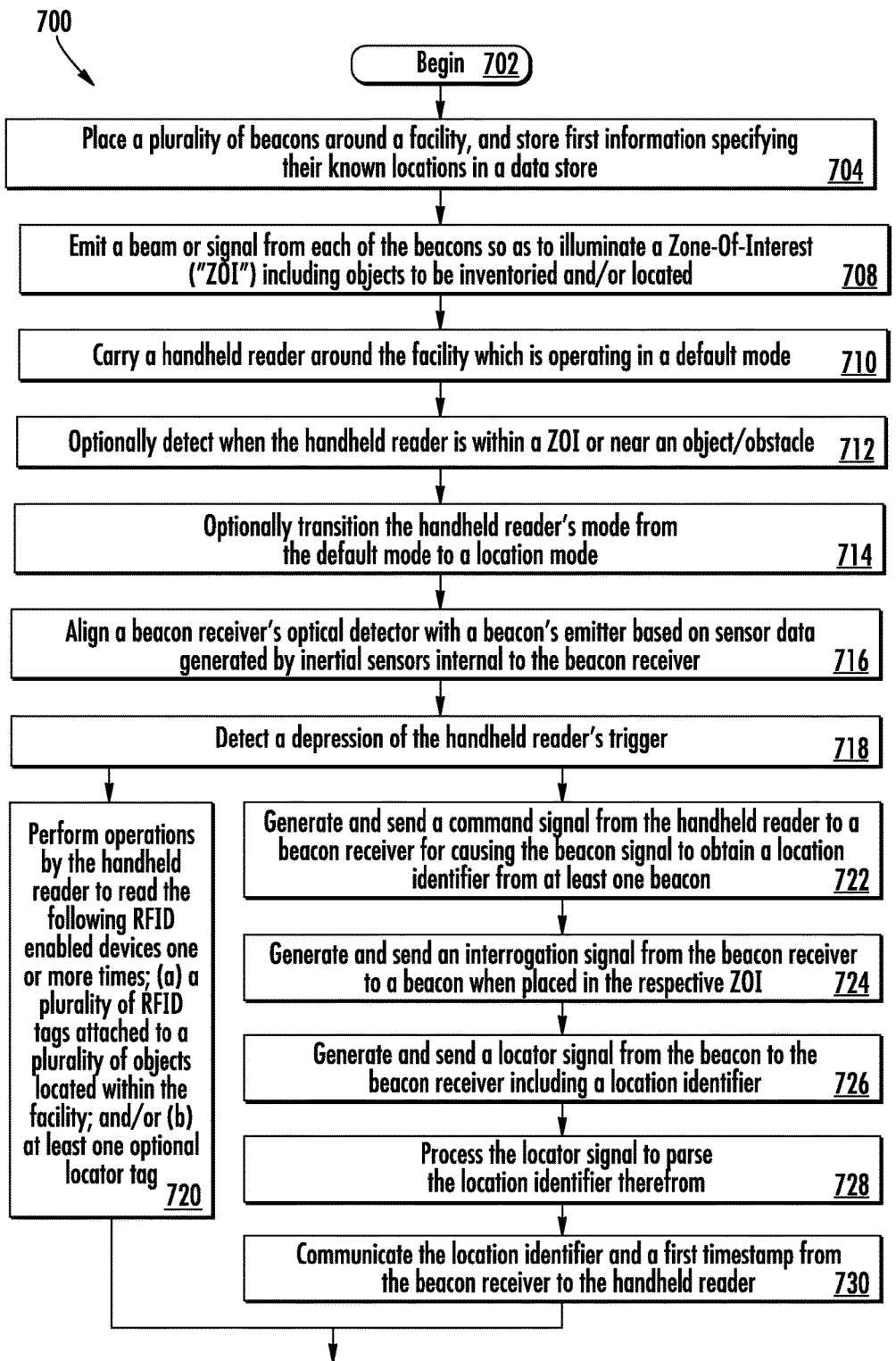
FIGS. 7A-7B (collectively referred to herein as "FIG. 7") provide a flow diagram of an exemplary method for determining a location of a RFID tags within a facility.

Referring now to FIG. 7, there is provided a flow diagram of an exemplary method 700 for locating RFID tags (e.g., RFID tags $112_1, \ldots, 112_N, 118_1, \ldots, 118_N$ of FIG. 1) within a facility (e.g., RSF 128 of FIG. 1). Method 700 begins with step 702 and continues with step 704. In step 704, a plurality of beacons (e.g., beacons $106_1, \ldots, 106_M$ of FIG. 1) are strategically placed around the facility. In some scenarios, the beacons are disposed on ceilings, walls, display equipment (e.g., display equipment $102_1, \ldots, 102_M$ of FIG. 1), emergency equipment, checkout counters and/or EAS system equipment. Notably, each beacon has a known directional emission pattern and location within the facility. First information specifying the beacons' locations with the facility is stored in a data store (e.g., data store 126 of FIG. 1) for later use in an RFID tag locating process. The beacons can be arranged such that their antenna patterns do or do not overlap.

Next in step 708, a beam or signal is emitted from each of the beacons so as to illuminate a ZOI including objects to be inventoried and/or located. For example, a beam is emitted from a beacon to illuminate a particular shelving unit or other piece of display equipment (e.g., a table).

Upon completing step 708, step 710 is performed where a handheld reader (e.g., handheld reader 120 of FIG. 1) is carried around the facility. At this time, the handheld reader is operating in a default mode, i.e., using a maximum power and reading RFID tags (e.g., RFID tags $112_1, \ldots, 112_N, 118_1, \ldots, 118_N$ of FIG. 1) only once to ensure inventory accuracy in a timely manner.

In some scenarios, the mode of the handheld reader is automatically changed when a detection is made that the handheld reader is in a beacon's ZOI or near and object/obstacle, as shown by optional steps 712 and 714. For example, the handheld reader is transitioned from its default mode to its location mode when a detection is made that the handheld reader is in a beacon's ZOI. In the location mode, the handheld reader toggles between reads at high power and reads at low power to allow location accuracy. In location mode, an RFID tag can be read multiple times to allow the correlation logic to re-allocate an RFID tag from one location to another. The power can be dynamically adjusted depending on the RFID tag density being read. As inventory accuracy has to be maintained, the power applied in location mode can be reduced in case of dense tag population, and vice versa.

A beacon receiver (e.g., beacon receiver 150 of FIG. 1) may be provided as an accessory for the handheld reader or as a separate standalone device worn by an operator of the handheld reader. The beacon receiver is provided for communicating with the beacons disposed around the facility while the handheld reader is reading RFID tags. As such, step 716 is performed where the beacon receiver's optical detector is aligned with a beacon's emitter based on sensor data generated by inertial sensors (e.g., inertial sensors 152 of FIG. 1) located internal to the beacon reader.

After completing step 716, step 718 is performed where a detection is made. More particularly, depression of a trigger (e.g., trigger 370 of FIG. 3) is detected by the handheld reader. The trigger is depressed by an operator when (s)he wants the handheld reader to read RFID tags. In response to this detection, method 700 continues with step 720 and steps 722-730, which are performed concurrently. Step 720 involves performing operations by the handheld reader to read the following RFID enabled devices one or more times: (a) a plurality of RFID tags attached to a plurality of objects (e.g., objects $110_1, \ldots, 110_N, 116_1, \ldots, 116_N$ of FIG. 1) located within the facility; and/or (b) at least one optional locator tag.

While step 720 is being performed, steps 722-730 are performed. These steps involve: generating and sending a command signal from the handheld reader to a beacon receiver for causing the beacon signal to obtain a location identifier from at least one beacon; generating and sending an interrogation signal from the beacon receiver to a beacon when placed in the respective ZOI; generating and sending a locator signal from the beacon to the beacon receiver including a location identifier; processing the locator signal to parse the location identifier therefrom; and communicating the location identifier and a first timestamp from the beacon receiver to the handheld receiver.

Figure 7B:
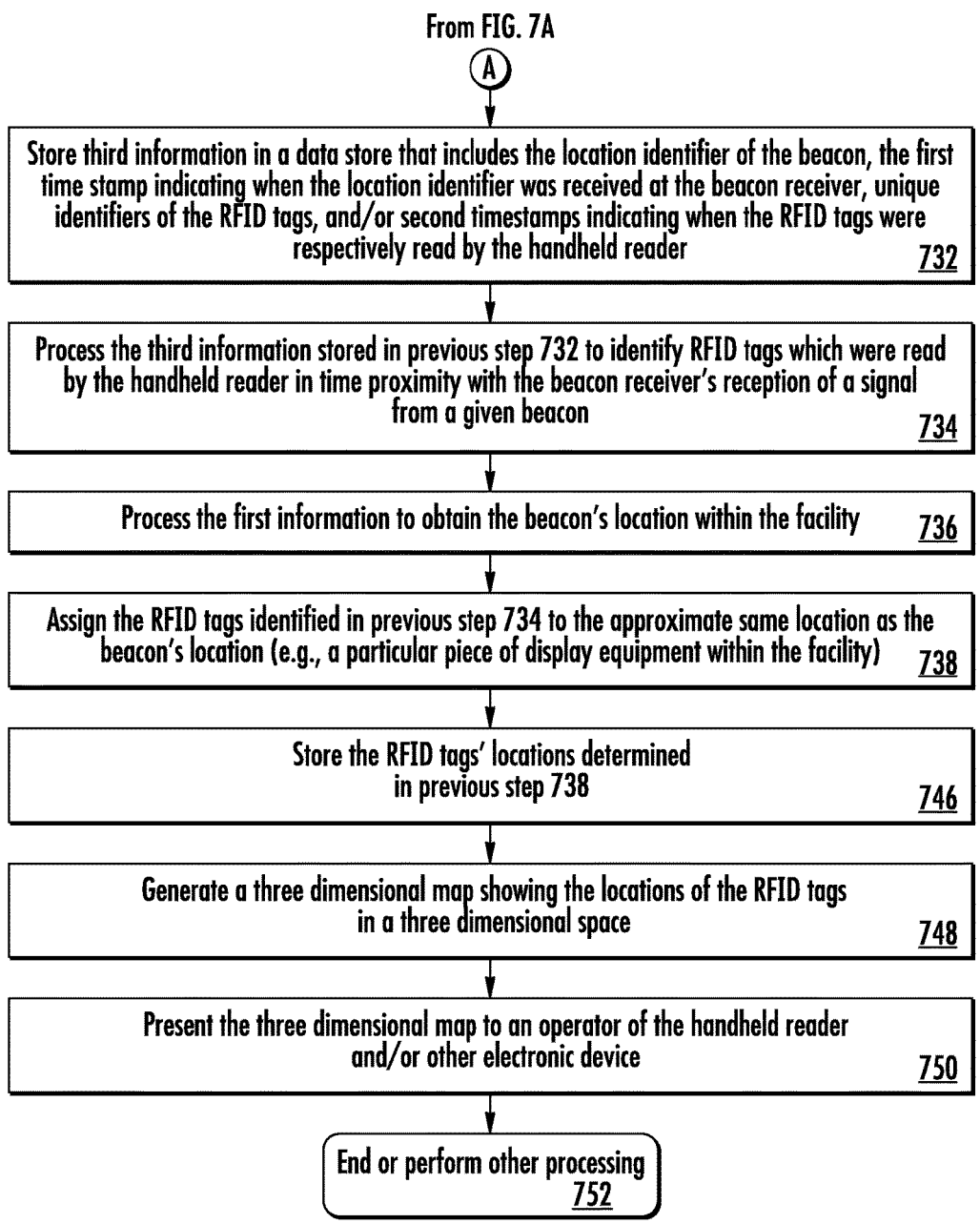

Upon completing steps 720 and 730, the method 700 continues with step 732 of FIG. 7B. In step 732, third information is stored in the data store. The third information includes the location identifier of the beacon, the first time stamp indicating when the location identifier was received at the beacon receiver, unique identifiers of the RFID tags, and/or second timestamps indicating when the RFID tags were respectively read by the handheld reader. The third information is then processed in step 734 to identify RFID tags which were read by the handheld reader in time proximity with the beacon receiver's reception of a signal from a given beacon.

The first information is also processed in step 736 to obtain the beacon's location within the facility. The RFID tags (identified in previous step 734) are assigned to the approximate same location as the beacon's location (e.g., a particular piece of display equipment within the facility), as shown by step 738.

The RFID tags' locations are then stored in the data store, as shown by step 746. A three dimensional map is generated in step 748 which shows the locations of the RFID tags in a three dimensional space. The location of the handheld reader, beacons, locator tags, and/or beacon receiver may also be shown in the three dimensional map. The three dimensional map is then presented to an operator of the handheld reader and/or other electronic device, as shown by step 750. Subsequently, step 752 is performed where method 700 ends or other processing is performed.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for uniquely identifying areas within a facility for location services, comprising:
    operating a plurality of beacons disposed within the facility;
    emitting, from at least a first beacon of the plurality of beacons, a first beam having a first beamwidth in a manner so as to communicate at least a unique identification code associated with a first physical area of the facility;
    receiving the unique identification code communicated via the first beam at a remote beacon receiver;
    performing operations by the remote beacon receiver to facilitate a setting of an operational mode of a mobile tag reader based on the unique identification code communicated via the first beam;
    changing a value for a beamwidth parameter to modify an area of coverage for the first beacon, where said changing is performed autonomously by the first beacon or in response to the first beacon's reception of a command from the remote beacon receiver;
    emitting, from the first beacon, a second beam having a second beamwidth in a manner so as to communicate at least the unique identification code associated with the first area of the facility, where the second beamwidth is different from the first beamwidth; and
    performing operations by the remote beacon receiver to facilitate a renewal of the operational mode based on the unique identification code communicated via the second beam.

2. The method according to claim 1, wherein the value for the beamwidth parameter is changed so that at least two of the beacons have an overlapping area of coverage.

3. The method according to claim 1, wherein information specifying the first beamwidth is communicated from the first beacon via the first beam and information specifying the second beamwidth is communicated from the first beacon via the second beam.

4. The method according to claim 1, further comprising minimizing interference between the first beacon and an adjacent second beacon of the plurality of beacons by communicating error correction codes from the first beacon via the first and second beams.

5. The method according claim 1, further comprising using randomized transit timing to minimize interference between the first beacon and an adjacent second beacon of the plurality of beacons.

6. The method according to claim 5, wherein each of the plurality of beacons has a known directional emission pattern.

7. The method according to claim 1, wherein the remote beacon receiver is worn by a person or carried by the person as an accessory of the mobile tag reader.

8. The method according to claim 1, further comprising:
    determining an inaccurate location of a mobile tag in the facility using the mobile tag reader to read a fixed tag with a known location; and increasing an accuracy of the inaccurate location using the first beacon's known physical location which is associated with the unique identification code emitted from the first beacon via the first or second beam.

9. The method according to claim 8, further comprising considering the mobile tag as being located in a Zone Of Interest ("ZOI") of the first beacon for which the unique identifier has been received by the mobile tag reader if a read of the mobile tag occurred within a certain time period inclusive of a time at which the read of the fixed tag occurred.

10. The method according to claim 9, further comprising generating a map showing at least one of a location of the mobile tag reader relative to the first beacon in multi-dimensional space and a location of the fixed tag relative to the first beacon in multi-dimensional space.

11. A system, comprising:
a mobile tag reader;
a plurality of beacons disposed within a facility and comprising a first beacon that emits a first beam having a first beamwidth in a manner so as to communicate at least a unique identification code associated with a first physical area of the facility, has a value for a beamwidth parameter which is changed to modify an area of coverage for the first beacon autonomously by the first beacon or in response to the first beacon's reception of a command from a remote beacon receiver, and
emits a second beam having a second beamwidth in a manner so as to communicate at least the unique identification code associated with the first area of the facility, where the second beamwidth is different from the first beamwidth;
a remote beacon receiver configured to perform operations to facilitate a setting of an operational mode of the mobile tag reader based on the unique identification code communicated via the first beam and to facilitate a renewal of the operational mode based on the unique identification code communicated via the second beam.

12. The system according to claim 11, wherein the value for the beamwidth parameter is changed so that at least two of the beacons have an overlapping area of coverage.

13. The system according to claim 11, wherein information specifying the first beamwidth is communicated from the first beacon via the first beam and information specifying the second beamwidth is communicated from the first beacon via the second beam.

14. The system according to claim 11, further comprising minimizing interference between the first beacon and an adjacent second beacon of the plurality of beacons by communicating error correction codes from the first beacon via the first and second beams.

15. The system according claim 11, wherein randomized transit timing is used to minimize interference between the first beacon and an adjacent second beacon of the plurality of beacons.

16. The system according to claim 15, wherein each of the plurality of beacons has a known directional emission pattern.

17. The system according to claim 11, wherein the remote beacon receiver is worn by a person or carried by the person as an accessory of the mobile tag reader.

18. The system according to claim 11, wherein:
the mobile tag reader is configured to read a fixed tag with a known location to facilitate a determination of an inaccurate location of a mobile tag in the facility; and
the unique identification code is used to increases an accuracy of the inaccurate location.

19. The system according to claim 18, wherein the mobile tag is considered as being located in a Zone Of Interest ("ZOI") of the first beacon for which the unique identifier has been received by the mobile tag reader if a read of the mobile tag occurred within a certain time period inclusive of a time at which the read of the fixed tag.

20. The system according to claim 19, wherein a map is generated by the mobile tag reader that shows at least one of a location of the mobile tag reader relative to the first beacon in multi-dimensional space and a location of the fixed tag relative to the first beacon in multi-dimensional space.

* * * * *